United States Patent

Sugimoto

[11] Patent Number: 5,345,833
[45] Date of Patent: Sep. 13, 1994

[54] HEATER CONTROL UNIT FOR AUTOMOBILE

[75] Inventor: Satoshi Sugimoto, Aichi, Japan

[73] Assignee: Kabushiki Kaisha Tokai Rika Denki Seisakusho, Aichi, Japan

[21] Appl. No.: 119,647

[22] Filed: Sep. 13, 1993

[30] Foreign Application Priority Data

Sep. 16, 1992 [JP] Japan ................ 4-064505[U]

[51] Int. Cl.⁵ .................... F16H 27/02; F16C 1/12
[52] U.S. Cl. ...................... 74/89; 74/10 R; 74/10.15; 74/89.13; 74/89.18; 74/501.6
[58] Field of Search .............. 74/89, 89.15, 89.13, 74/89.18, 89.21, 501.6, 502, 553, 10 R, 10.1, 10.15, 10.2, 10.33, 10.39; 62/161; 454/159; 236/51

[56] References Cited

U.S. PATENT DOCUMENTS

| | | | |
|---|---|---|---|
| 2,123,978 | 7/1938 | Wagner | 74/10.39 |
| 2,484,331 | 10/1949 | Bels | 74/10.15 |
| 2,914,314 | 11/1959 | Arlauskas | 74/89.13 |
| 3,472,084 | 10/1969 | Ellis | 74/89 |
| 3,724,280 | 4/1973 | Olah | 74/10.33 |
| 4,665,469 | 5/1987 | Furfari et al. | 74/89.13 X |
| 4,995,278 | 2/1991 | Huang | 74/89.15 |
| 5,127,280 | 7/1992 | Terano et al. | 74/89 |
| 5,140,760 | 8/1992 | Mannbro | 74/89.21 X |
| 5,214,971 | 6/1993 | Burton et al. | 74/89.15 X |
| 5,251,466 | 10/1993 | Chang | 74/89.13 |

FOREIGN PATENT DOCUMENTS

| | | | |
|---|---|---|---|
| 4138614 | 5/1993 | Fed. Rep. of Germany | 74/89.13 |
| 1194158 | 11/1959 | France | 74/89.13 |
| 3-276320 | 12/1991 | Japan | 74/89.13 |
| 890103 | 2/1962 | United Kingdom | 74/89.13 |
| 987337 | 3/1965 | United Kingdom | 74/89 |

*Primary Examiner*—Vinh T. Luong

[57] ABSTRACT

A heater control unit of a dial type installed on an instrument panel and functioning as an operation portion of an air conditioner equipped in an automobile. The first bevel gear is integral with the shaft coupled with a dial. The first and second supports are integral with the base member. The first support is sectionally crank-shaped and the upper support wall thereof is disposed at the outside of the lower support wall with respect to the second support. The upper support wall has an approximately semi-circular upper support surface for receiving a portion of the shaft upper than the axis thereof, and the lower support wall has an approximately semi-circular lower support surface for receiving a portion of the shaft lower than the axis thereof. The distance between the inner surface of the lower support wall of the first support and the inner surface of the second support is longer than the distance between an end surface at the second support side of the shaft and an end surface at the first support side of the first bevel gear. The distance between the inner surface of the upper support wall of the first support and the inner surface of the second support is shorter than the entire length of the shaft.

4 Claims, 6 Drawing Sheets

HEATER CONTROL UNIT FOR AUTOMOBILE

BACKGROUND OF THE INVENTION

1. Field of the Invention

The present invention relates to a heater control unit, of an air conditioner equipped in an automobile, installed on an instrument panel to serve as a means for changing air amount and adjusting the temperature inside the automobile.

2. Description of the Related Arts

In a conventional heater control unit, a dial is rotated to change air amount and adjust the temperature inside the automobile. In the heater control unit of this type, a first bevel gear is mounted on a shaft with which the dial is connected, and the rotation of a second bevel gear engaging the first bevel gear is transmitted to a pivotal lever with which a cable extending from a damper of an air conditioner is connected. In this construction, the lever is pivoted by rotating the dial. As a result, the damper is opened and closed.

FIGS. 6 and 7 show how a shaft is mounted to a first conventional heater control unit. The heater control unit comprises a base member 1, and a shaft 2, one end of which is connected with a dial 3. The shaft 2 is held by a pair of supports 1a and 1b which are integrally formed with the base member 1. A first bevel gear 4 is mounted on the shaft 2 at a position intermediate between the supports 1a and 1b. A portion 2a of the shaft 2 to be inserted into the first bevel gear 4 and a corresponding opening 4a of the first bevel gear 4 are sectionally rectangular as shown in FIG. 7 so that the first bevel gear 4 rotates together with the shaft 2.

A transmitting member 5 is rotatably supported by a pin 1c extending vertically upward from the base member 1. The transmitting member 5 comprises a second bevel gear 5a engaging the first bevel gear 4 and a spur gear 5b formed integrally with the second bevel gear 5a. Another spur gear engaging the spur gear 5b and a pivotal lever are fixed to a shaft which is supported on the base member 1, and the pivotal lever is connected to a damper of an air conditioner via a cable (not shown).

A construction for mounting a shaft to a second conventional heater control unit is described below with reference to FIGS. 8 and 9. A first bevel gear 12a is integrally formed with a shaft 12 to which a dial 13 is fixed. One end of the shaft 12 is supported by a first support 11a which is integrally formed with a base 11. The other end (distal end) of the shaft 12 is held in the following manner. That is, a second bevel gear 14 is supported on a pin 11b formed on the base 11, a support member 15 as a second support is mounted on a distal end 12b of the shaft 12, and the support 15 is fixed by a pin 16. The rotation of the second bevel gear 14 is transmitted to a pivotal lever via a spur gear not shown.

In the first conventional heater control unit, the distal end of the shaft 2 is inserted through the support 1a from the left side in FIG. 6 (instrument panel side), and then, the first bevel gear 4 is mounted on the shaft 2. Then, the distal end of the shaft 2 is inserted through the second support 1b, and then, a snap ring 6 is fitted to the shaft 2. Therefore, complicated works are required in the assembling operation. In the second conventional heater control unit, first bevel gear 12a is integral with the shaft 12, so that the operation of mounting the former on the latter is not required. But it is necessary to perform a complicated work of receiving the distal end of the shaft 12 by the holding member 15.

In the above-described conventional heater control units, not only complicated works are required in the assembling operation, but also the manufacturing cost is relatively high because it is difficult to integrate both the shaft and the first bevel gear with each other and the base member and the first and second supports with each other.

SUMMARY OF THE INVENTION

It is an object of the present invention to provide a heater control unit which can be easily assembled and manufactured at a low cost by integrating a shaft and a first bevel gear with each other and a base member and first and second supports with each other.

In accomplishing these and other objects of the present invention, there is provided a heater control unit for use in an automobile comprising: a shaft supported by a first support and a second support provided on a base member and connected with an operation dial at an end thereof; a first bevel gear disposed on the shaft between the first and second supports; a second bevel gear rotating about an axis perpendicular to the shaft and engaging the first bevel gear; a pivotal lever with which a cable coupled with an automobile air conditioner is connected; and transmitting means for transmitting the rotation of the second bevel gear to the pivotal lever.

In the heater control unit of the present invention, the first bevel gear is formed integrally with the shaft. The first and second supports are formed integrally with the base member. The first support is sectionally crank-shaped and comprises: a lower support wall having an approximately semi-circular lower support surface for receiving a portion of the shaft lower than the axis thereof; and an upper support wall having an approximately semi-circular upper support surface for receiving a portion of the shaft upper than the axis thereof. The upper support wall is disposed at the outside of the lower support wall with respect to the second support. The distance between the inner surface of the lower support wall of the first support and the inner surface of the second support is longer than the distance between an end surface at the second support side of the shaft and an end surface at the first support side of the first bevel gear. The distance between the inner surface of the upper support wall of the first support and the inner surface of the second support is shorter than the entire length of the shaft. When the shaft is stepped in the first support side with respect to the first bevel gear, the end surface at the first support side of the first bevel gear means the end surface of the step.

According to the above construction, in mounting the shaft on the base member, one end of the shaft is moved obliquely downward to be inserted between the upper support surface of the crank-shaped first support and the lower support surface thereof until the end surface at the first support side of the first bevel gear is brought into contact with the inner surface of the first support. The distances between the inner surfaces of the upper and the lower support walls and the inner surface of the second support are limited in connection with the dimension between the end surface at the first support side of the first bevel gear and the end surface at the second support side of the shaft, and the entire length of the shaft. Therefore, the end surface at the second support side of the shaft can be moved downward without contacting with the second support. Then the operation of assembling the shaft to the base member is completed by inserting the end of the shaft into the second support.

In the above construction, since the first support is sectionally crank-shaped, the shaft and the first bevel gear can be formed integrally to each other and the base member and the first and second support can be formed integrally to each other. Therefore, the heater control unit can be manufactured at a low cost. Further, the shaft can be assembled easily to the base member. Thereafter, the snap ring is fitted on the shaft so as to prevent the shaft from moving axially. In this manner, the shaft can be reliably held by both supports. The dial mounted on the shaft is rotated to transmit rotation of the shaft to the pivotal lever via the first bevel gear, the second bevel gear, and the transmitting means. As a result, the damper of the air conditioner can be reliably operated via the cable.

BRIEF DESCRIPTION OF THE DRAWINGS

These and other objects and features of the present invention will become clear from the following description taken in conjunction with the preferred embodiment thereof with reference to the accompanying drawings, in which.

DETAILED DESCRIPTION OF THE INVENTION

Figure 1:
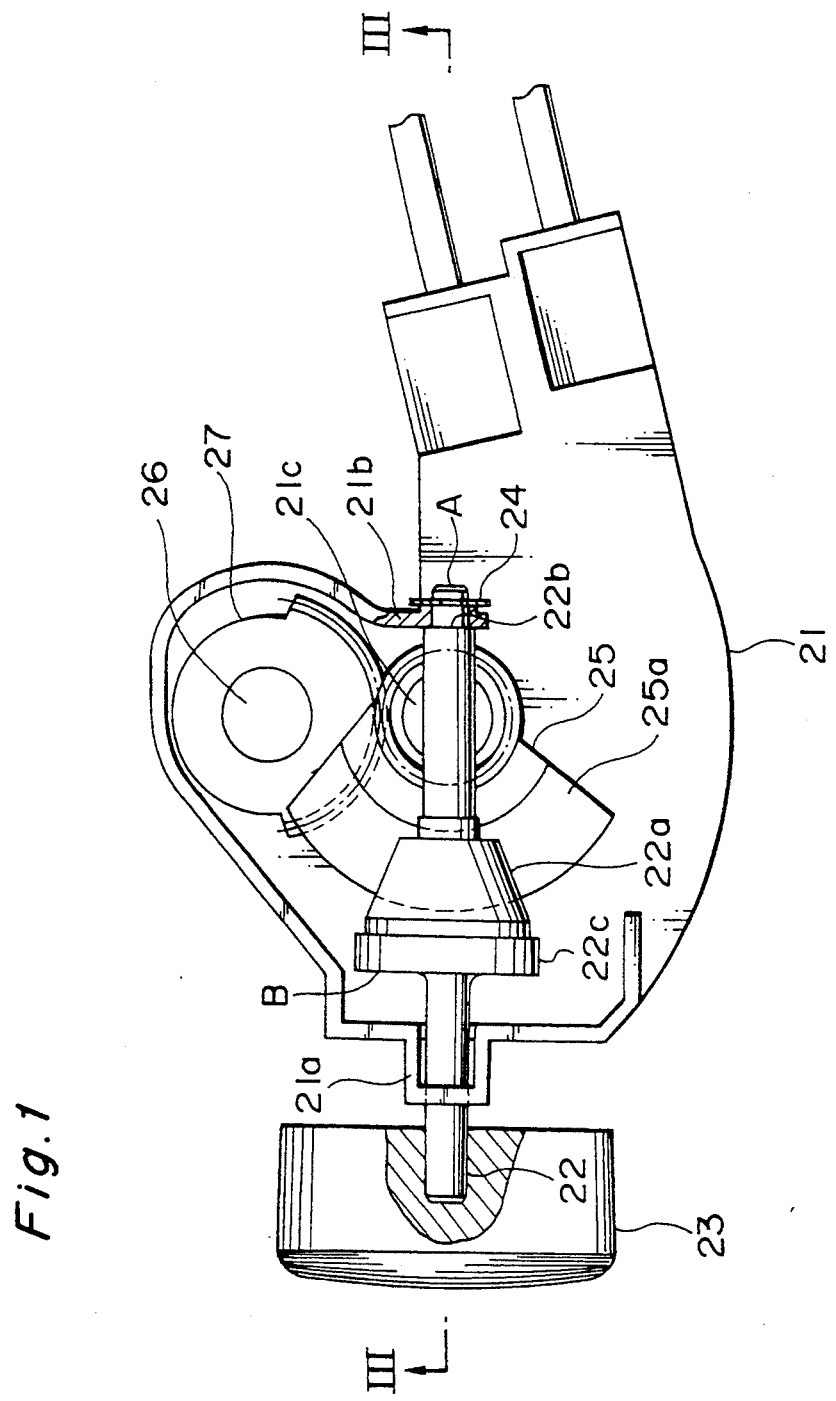
FIG. 1 is a plan view showing a heater control unit according to an embodiment of the present invention.

Before the description of the present invention proceeds, it is to be noted that like parts are designated by like reference numerals throughout the accompanying drawings.

A heater control unit according to an embodiment of the present invention is described below with reference to FIGS. 1 through 5.

Figure 2:
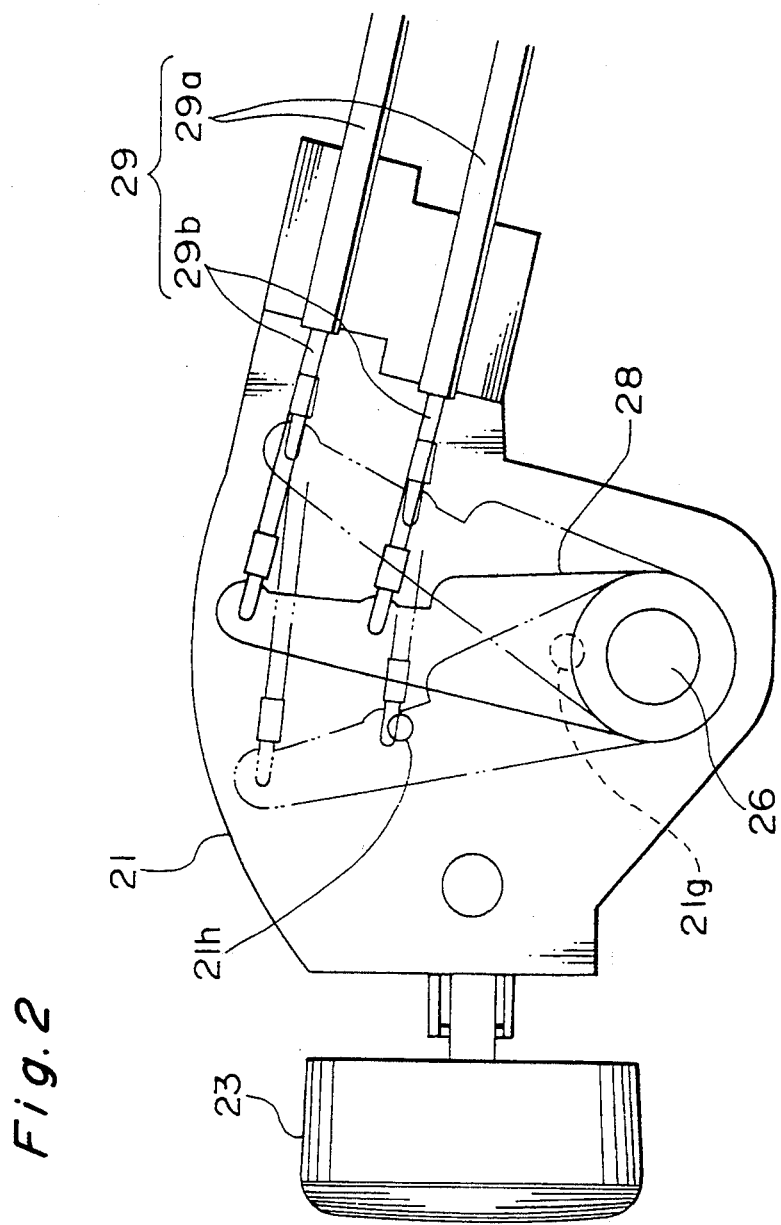
FIG. 2 is a bottom view showing the heater control unit of FIG. 1.
Figure 3:
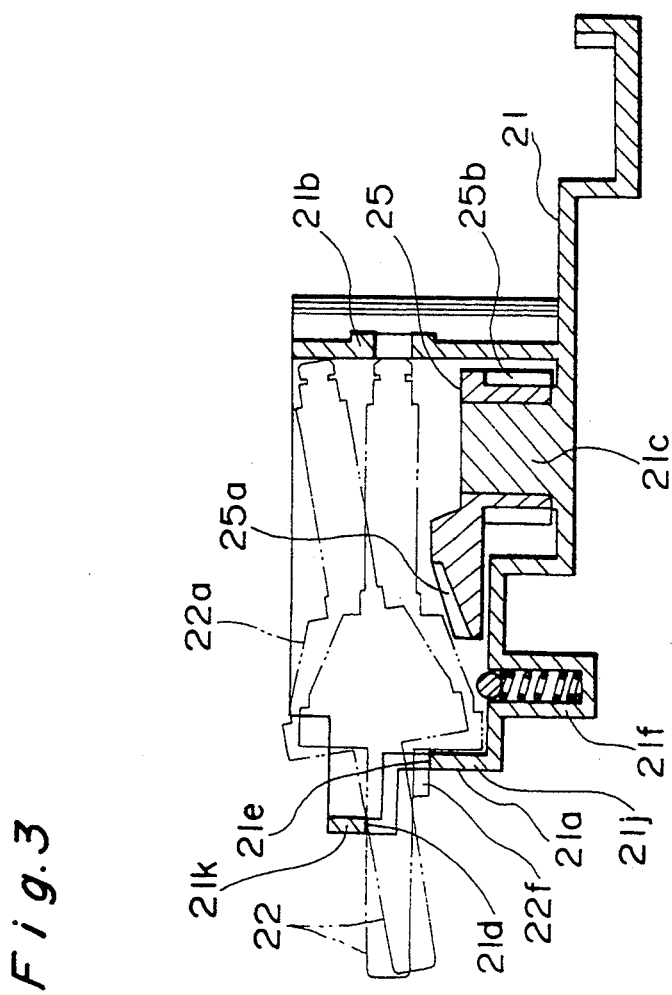
FIG. 3 is a sectional view, showing the heater control unit, taken along a line III—III of FIG. 1.

Referring to FIGS. 1 through 3, a base member 21 has a first support 21a and a second support 21b, both of which are integrally formed therewith. An operation dial 23 is mounted to a shaft 22 at one end thereof. A first bevel gear 22a is integrally formed with the shaft 22 at an intermediate portion of the shaft 22. The configuration of the teeth of the first bevel gear 22a is not shown in the drawings for simplification. A step 22b is formed in the vicinity of the other end (distal end) of the shaft 22. A snap ring 24 is fitted on a small-diameter portion of the shaft 22 disposed in the distal end thereof inserted through the second support 21b so that the shaft 22 is prevented from moving in the axial direction thereof.

The base 21 has an integrally formed supporting pin 21c extending at a right angle with the shaft 22. A gear 25 is rotatably supported by the supporting pin 21c. The gear 25 comprises a second bevel gear 25a and a first spur gear 25b (see FIG. 3). The second bevel gear 25a engages the first bevel gear 22a. The first spur gear 25b is coaxial with the second bevel gear 25a. The configuration of the teeth is omitted in FIG. 1. The base 21 holds a rotatable shaft 26. A second spur gear 27 engaging the first spur gear 25b is fixed to the shaft 26. The teeth of the second spur gear 27 are formed in a circumferentially limited region thereof so that the base 21 can be formed compactly.

Referring to FIG. 2, a pivotal lever 28 is mounted on the shaft 26 under the base 21. A cable 29 is connected with the pivotal lever 28. The cable 29 comprises an outer cable 29a fixed to the base 21 by an unshown clamp and an inner cable 29b movable in the outer cable 29a. One end (not shown) of the inner cable 29b is connected with a damper of an air conditioner. The rotation of the second bevel gear 25a is transmitted to the pivotal lever 28 via transmitting means, namely, the first spur gear 25b and the second spur gear 27. As a result, the damper of the air conditioner is opened and closed, thereby, for example, adjusting the amount of air.

Figure 5:
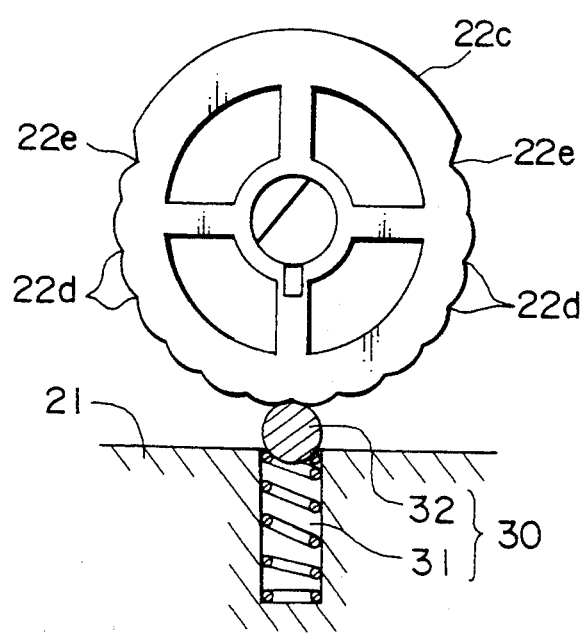
FIG. 5 is a view showing the construction of a click means for positioning a dial.
Figure 6:
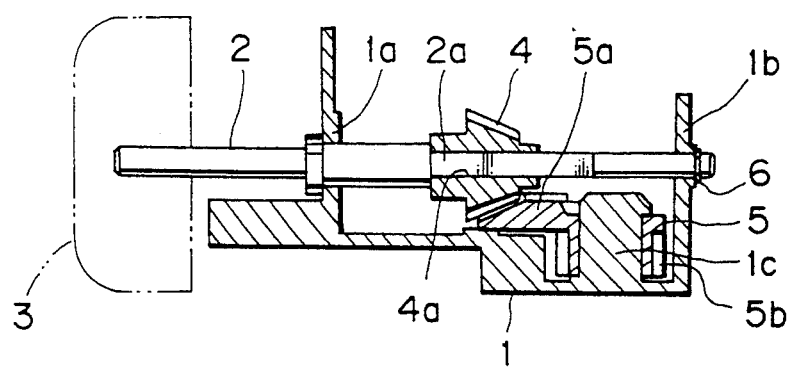
FIG. 6 is a sectional view showing a construction of mounting a shaft of a first conventional heater control unit to a base member thereof.
Figure 7:
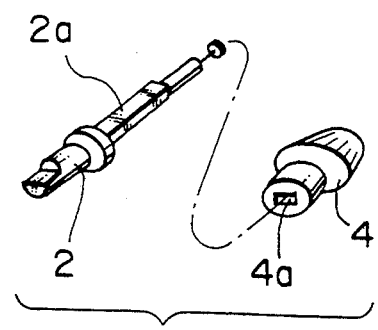
FIG. 7 is a perspective view showing the state in which the shaft and a first bevel gear are separated from each other.
Figure 8:
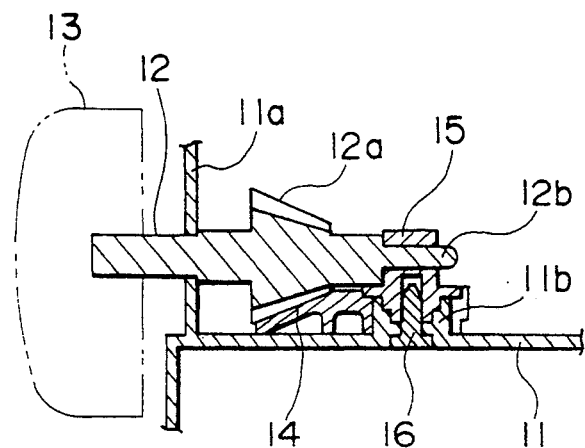
FIG. 8 is a sectional view showing a construction of mounting a shaft of a second conventional heater control unit to a base member thereof.
Figure 9:
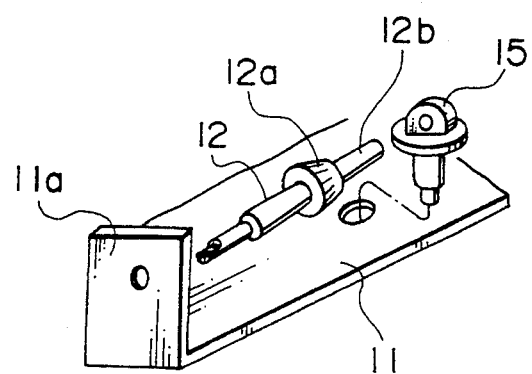
FIG. 9 is an exploded perspective view showing how the shaft is mounted to the base member.

In this embodiment, an annular portion 22c integrally formed with the shaft 22 and having a plurality of concaves 22d and 22e uniformly formed on the peripheral surface thereof is adjacent to the first bevel gear 22a as shown in FIG. 5. The annular portion 22c serves as a click means for retaining the dial 23 at a certain position. The base member 21 has a plunger 30 comprising a spring 31 and a ball 32 both disposed inside a holding portion 21f thereof so that the ball 32 is pressed against the peripheral surface of the annular portion 22c. The concaves 22e formed at both ends of the concaves are deeper than the intermediate concaves 22d. Thus, the ball 32 is held by the concaves 22e strongly when the pivotal lever 28 is at both ends of the pivotal range, namely, when the inner cable 29b is pressed to one end of its movable range and pulled to the other end of its movable range.

The first support 21a is formed in crank-shape and comprises a lower support wall 21j and an upper support wall 21k. The lower support wall 21j has an approximately semi-circular lower support surface 21e for receiving a portion of the shaft 22 lower than the axis thereof. The upper support wall 21k has an approximately semi-circular upper support surface 21d for receiving a portion of the shaft 22 upper than the axis thereof. The upper support wall 21k is disposed at the outside of the lower support wall 21j with respect to the second support 21b. The distance between the inner surface of the lower support wall 21j of the first support 21a and the inner surface of the second support 21b is a little longer than the distance between an end surface A at the second support side of the shaft 22 and an end surface B at the first support side of the annular portion 22c which is integrally formed with the first bevel gear 22a. Further, the distance between the inner surface of the upper support wall 21k of the first support 21a and the inner surface of the second support 22b is shorter than the entire length of the shaft 22.

The gears and the shafts are assembled as follows in this embodiment. Initially, the gear 27 is mounted to the shaft 26, and the shaft 26 is mounted on the base 21. A positioning opening 21g (FIG. 2) is formed on the base 21 and an unshown opening corresponding to the positioning opening 21g is formed on the gear 27. A pin not shown is used to locate the gear 27 at a position shown in FIG. 1 when the shaft 26 and the gear 27 are mounted to the base 21. Then, the gear 25 is mounted on the pin 21c. A positioning opening 21h is formed on the base 21. An opening (not shown) corresponding to the positioning opening 21h is formed on the gear 25. Similarly to the installation of the shaft 26 and the gear 27 on the base 21, a pin not shown is used when the gear 25 is mounted to the base 21.

Figure 4:
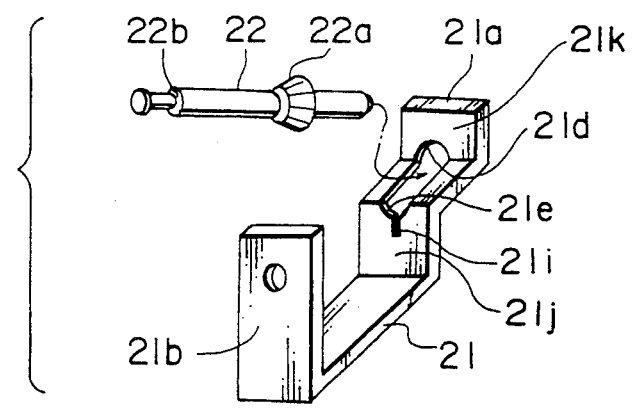
FIG. 4 is an exploded perspective view showing how a shaft is mounted to a base member.

Then, as shown in FIGS. 3 and 4, the shaft 22 is moved obliquely downward to be inserted between the upper support surface 21d of the first support 21a and the lower support surface 21e thereof until the end surface B of the annular portion 22c is brought into contact with the inner surface of the lower support wall 21j of the first support 21a. As described above, the distance between the end surfaces A and B is shorter than that between the lower support wall 21j and the second support 21b. Accordingly, the distal end of the shaft 22 can be moved downward without contacting with the second support 21b. Then, the distal end of the shaft 22 is inserted through the second support 21b, and then, the snap ring 24 is fitted to the shaft 22. A projection 22f is formed on the shaft 22, adjacent to the end surface B of the annular portion 22c, and a groove 21i for receiving the projection 22f is formed on the first support 21a so that the concaves 22d and 22e of the annular portion 22c are positioned appropriately with respect to each of the gears 25 and 27. Finally, the dial 23 is fixed to the shaft 22.

When the dial 23 is rotated, the rotation of the shaft 22 is transmitted to the pivotal lever 28 via the first bevel gear 22a, the second bevel gear 25a, the first spur gear 25b, and the second spur gear 27. As a result, the inner cable 29b is pressed and pulled, thus opening and closing the damper of the air conditioner. In this manner, for example, the amount of air is adjusted. In this embodiment, in order to save manufacturing cost, the first bevel gear 22a is integral with the shaft 22, and the first and second supports 21a and 21b are integral with the base member 21. Further, since the first support 21a is sectionally crank-shaped, the shaft 22 can be mounted easily on the base member 21 by obliquely inserting the shaft 22 into the support 21a and 21b as described above with reference to FIGS. 3 and 4.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A heater control unit for use in an automobile comprising:
    a shaft supported by a first support and a second support formed on a base member and connected with an operation dial at an end thereof;
    a first bevel gear disposed on the shaft between the first and second supports;
    a second bevel gear rotating about an axis perpendicular to the shaft and engaging the first bevel gear;
    a pivotal lever with which a cable coupled with an automobile air conditioner is connected;
    transmitting means for transmitting the rotation of the second bevel gear to the pivotal lever in which:
    the first bevel gear is integrally formed with the shaft;
    the first and second supports are integrally formed with the base member; and
    the first support is sectionally crank-shaped and comprises: a lower support wall having an approximately semi-circular lower support surface for receiving a portion of the shaft lower than the axis thereof; and an upper support wall having an approximately semi-circular upper support surface for receiving a portion of the shaft upper than the axis thereof, in which: the upper support wall is disposed at the outside of the lower support wall with respect to the second support; the distance between the inner surface of the lower support wall of the first support and the inner surface of the second support is longer than the distance between an end surface at the second support side of the shaft and an end surface at the first support side of the first bevel gear; the distance between the inner surface of the upper support wall of the first support and the inner surface of the second support is shorter than the entire length of the shaft.

2. The heater control unit as defined in claim 1, wherein the transmitting means comprises a first spur gear formed integrally with the second bevel gear; and a second spur gear engaging the first spur gear and supported on the base member so that the second spur gear rotates together with the pivotal lever.

3. The heater control unit as defined in claim 1, wherein the second spur gear has teeth formed in an angle range corresponding to the pivotal angle range of the pivotal lever.

4. The heater control unit as defined in claim 1, further comprising click means for positioning the pivotal lever comprising: an annular portion integral with the shaft; and a positioning member pressed against the peripheral surface of the annular portion, in which: a plurality of concaves engaging the positioning member is formed on the annular portion at regular intervals.

* * * * *